US009645974B1

(12) United States Patent
Patil et al.

(10) Patent No.: US 9,645,974 B1
(45) Date of Patent: May 9, 2017

(54) OPTIMIZED MATRIX MULTIPLICATION USING VECTOR MULTIPLICATION OF INTERLEAVED MATRIX VALUES

(71) Applicant: Google Inc., Mountain View, CA (US)

(72) Inventors: Nishant Patil, Sunnyvale, CA (US); Matthew Sarett, Chapel Hill, NC (US); Rama Krishna Govindaraju, San Jose, CA (US); Benoit Steiner, Mountain View, CA (US); Vincent O. Vanhoucke, San Francisco, CA (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 14/644,967

(22) Filed: Mar. 11, 2015

(51) Int. Cl.
*G06F 7/50* (2006.01)
*G06F 17/16* (2006.01)

(52) U.S. Cl.
CPC .................................... *G06F 17/16* (2013.01)

(58) Field of Classification Search
CPC ....................................................... G06F 17/16
USPC ........................................................... 708/607
See application file for complete search history.

(56) References Cited

U.S. PATENT DOCUMENTS 5,875,355 A * 2/1999 Sidwell ..................... G06F 7/76
708/502
2009/0043836 A1* 2/2009 Dupaquis ................ G06F 7/525
708/607

OTHER PUBLICATIONS

Fedorov, "The Intel® Math Kernal Library Sparse Matrix Vector Multiply Format Prototype Package", copyright 2013, retrieved from internet https://software.intel.com/en-us/articles/the-intel-math-kernel-library-sparse-matrix-vector-multiply-format-prototype-package, 6 pages.
"Matrix multiplication", Wikipedia, last Modified Oct. 2014, retreived from internet http://en.wikipedia.org/w/index.php?title=Matrix_multiplication&oldid=628356790, 19 pages.
"Intel® Math Kernel Library, Getting Started Tutorial: Using the Intel® Math Kernel Library for Matrix Multiplication", copyright 2012, retrieved from internet https://software.intel.com/sites/products/documentation/doclib/stdxe/2013/composerxe/mkl/tutorials/mkl_mmx_c/tutorial_mkl_mmx_c.pdf, 21 pages.
Vanhoucke et al., "Improving the Speed of Neural Networks on CPUs", Published in 2011, 8 pages.

* cited by examiner

*Primary Examiner* — Tan V. Mai
(74) *Attorney, Agent, or Firm* — Fish & Richardson P.C.

(57) ABSTRACT

The present disclosure relates to optimized matrix multiplication using vector multiplication of interleaved matrix values. Two matrices to be multiplied are organized into specially ordered vectors, which are multiplied together to produce a portion of a product matrix.

20 Claims, 11 Drawing Sheets

OPTIMIZED MATRIX MULTIPLICATION USING VECTOR MULTIPLICATION OF INTERLEAVED MATRIX VALUES

BACKGROUND

In computing devices, a processor (e.g., a central processing unit (CPU)) may process instructions included in software applications. A processor may include instructions for performing mathematical operations on numerical values. One such operation is matrix multiplication, which involves producing a product matrix from two argument matrices consisting of rows and columns of numerical values. Matrix multiplication generally involves multiplying values from a row of the first matrix with values at the same index of the columns of the second matrix, adding the multiplied values together, and inserting the result into a position in the product matrix corresponding to the intersection of the row and column. The process then repeats for each row in the first matrix.

SUMMARY

The present disclosure relates to optimized matrix multiplication using vector multiplication of interleaved matrix values.

In general, one innovative aspect of the subject matter described in this specification can be embodied in methods that include the actions of identifying a first matrix and a second matrix to be multiplied to produce a result matrix, wherein the first matrix is defined by rows, each row including a plurality of row values at corresponding row indices, and the second matrix is defined by columns, each column including a plurality of column values at correspond column indices; creating a first intermediate matrix including the row values from the first matrix ordered such that row values at the index in adjacent pairs of rows from the first matrix are included at concurrent indices within a same row of the first intermediate matrix, the first intermediate matrix including at least two rows; creating a second intermediate matrix including the column values from the second matrix ordered such that column values at the same index in adjacent pairs of columns from the second matrix are included at concurrent indices within a same column of the second intermediate matrix, the second intermediate matrix including at least two columns; for each adjacent pair of rows in the first intermediate matrix: selecting adjacent pairs of columns in the second intermediate matrix, and for each selected adjacent pair of columns, and each pair of column values at the same index in the selected adjacent pair of columns: initialize a column vector with a repeating pattern of the pair of column values at the same index in the adjacent pair of columns; multiply the column vector by row vectors from the adjacent pair of rows containing row values at the same index as the pair of column values; and increment numeric values in a row of the result matrix corresponding to the adjacent pair of rows by a product of multiplying the column vector by the row vectors.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By executing multiple vector multiplication instructions on vectors from a specially arranged matrices, matrix multiplication operations may in some cases be performed in fewer instruction cycles than was possible utilizing previous techniques. Further, a processor including a matrix multiplication instruction to perform matrix multiplication in this way may lead to increased performance in applications executing large numbers of matrix multiplication operations. Optimizing the performance of matrix multiplication may also enable increased efficiency and performance in real time, user-facing applications.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
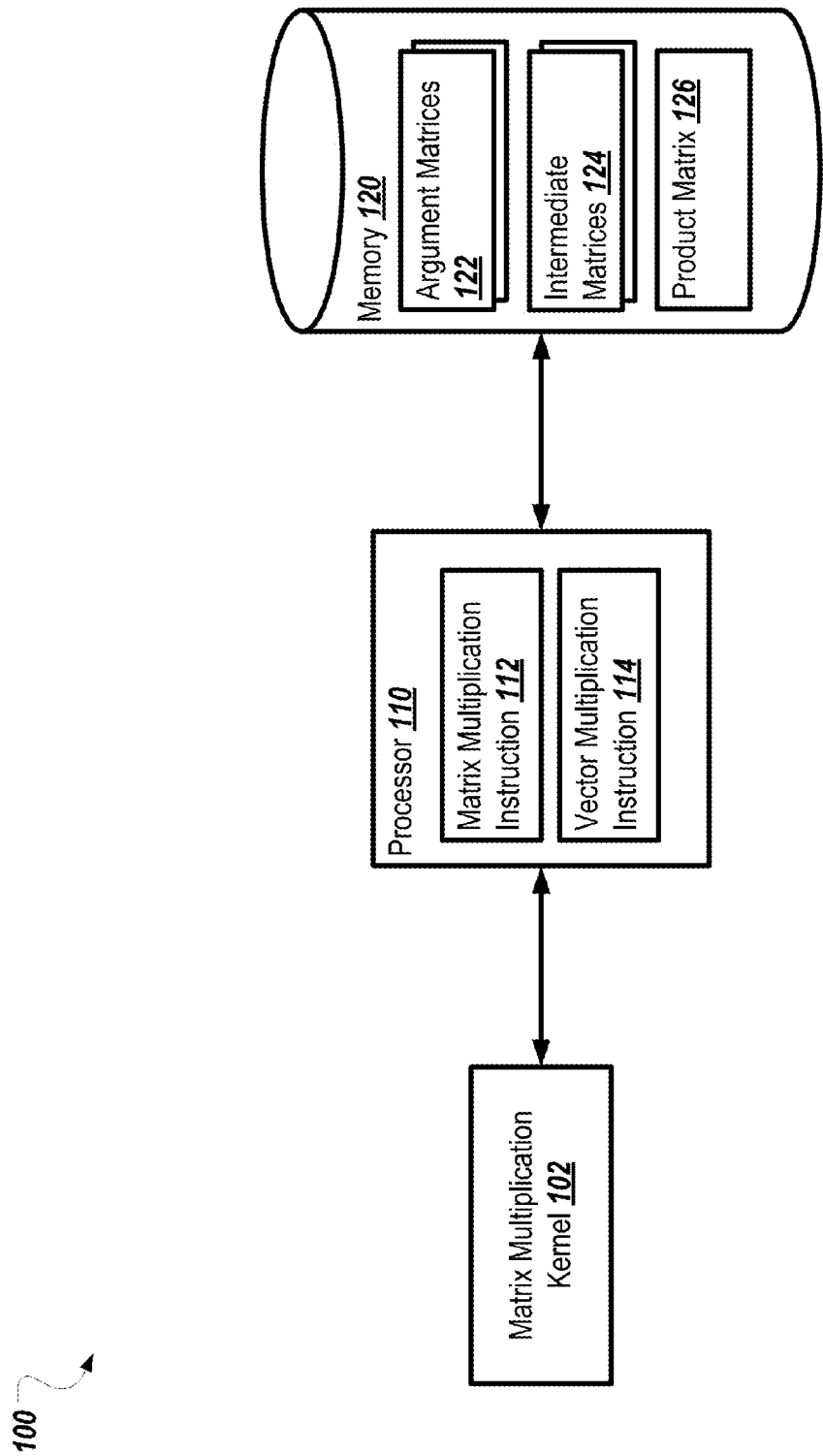
FIG. 1 is a block diagram of an environment in which optimized matrix multiplication operation using vector multiplication of interleaved matrix values can occur.

Matrix multiplication is at the core of many data processing tasks, such as, for example, speech recognition, image classification, graphics rendering and other tasks that involve rapidly processing large amounts of numerical data. Because of the high frequency with which matrix multiplication is performed in such applications, even incremental speed improvements in matrix multiplication algorithms can lead to significant performance gains. Accordingly, many processors include instructions to perform matrix multiplication, which generally involve multiplying each numerical value in a particular row of a first matrix by a corresponding value in a column of a second matrix corresponding to the particular row. For example, the first value in the first row of the first matrix is multiplied by the first value in the first column of the second matrix, the second value by the second value, and so on. These products are then summed, and inserted into a result matrix at a position corresponding to the intersection of the row from the first matrix and the column of the second matrix. Some processors also include optimized operations for multiplying vectors of numerical values. Such operations may take two vectors of numerical values as input, multiply values at corresponding offsets in each vector to produce a set of products, and add adjacent pairs of products to produce a result vector. In some cases, these vector multiplication instructions are very efficient and require few instruction cycles to complete.

Accordingly, the present disclosure describes techniques to perform matrix multiplication using these optimized vector multiplication instructions by reordering the matrices to be multiplied. One example method includes, given a column major and row major matrix to be multiplied, creating a first intermediate matrix including the row values from the row major matrix ordered such that row values at the index in adjacent pairs of rows from the row major matrix are included at concurrent indices within a same row of the first intermediate matrix. A second intermediate matrix is created including the column values from the column major matrix ordered such that column values at the same index in adjacent pairs of columns from the column major matrix are included at concurrent indices within a same column of the second intermediate matrix. Then, for each adjacent pair of rows in the first intermediate matrix, adjacent pairs of columns are selected from the second intermediate matrix. For each selected adjacent pair of columns, and each pair of column values at the same index in the selected adjacent pair of columns a column vector is initialized with a repeating pattern of the pair of column values at the same index in the adjacent pair of columns. The column vector is then multiple by row vectors from the adjacent pair of rows containing row values at the same index as the pair of column values. Numeric values in a row of a result matrix corresponding to the adjacent pair of rows are then incremented by a product of multiplying the column vector by the row vectors. In some implementations, the order of the matrices to be multiplied may be reversed, such that the column major matrix is the first argument and the row major matrix is the second argument.

These features and additional features are described in more detail below.

FIG. 1 is a block diagram of an environment 100 in which optimized matrix multiplication operation using vector multiplication of interleaved matrix values can occur. Environment 100 includes a matrix multiplication kernel 102 in communication with processor 110. The processor 110 includes an instruction set including a matrix multiplication instruction 112, the vector multiplication instruction 114, and unpack instructions 116. The processor 110 is connected to a memory 120, which may be, for example, a memory hierarchy with a series of caches. In operation, the matrix multiplication kernel 102 interacts with the processor 110 to perform a matrix multiplication operation on argument matrices 122 stored in the memory 120 to produce a product matrix 126. The matrix multiplication kernel 102 rearranges values in the argument matrices 122 to form intermediate matrices 124 stored in the memory 120. The intermediate matrices 124 are arranged such that contiguous row and column values can be passed as vectors to the vector multiplication instruction 114. By arranging the intermediate matrices 124 in this way, adjacent products summed by the vector multiplication instruction 114 correspond to summing operations that would be performed by the matrix multiplication instruction 112 in multiplying the argument matrices 122. Results of the vector multiplication instruction 114 are used to increment values in the product matrix 126 corresponding to the rows and columns from which the values in the multiplied vectors are selected. In some implementations, the creation of the intermediate matrices 124 and the vector multiplications may be performed by the matrix multiplication instruction 112 of the processor 110, such that the matrix multiplication kernel 102 may pass the argument matrices 122 as arguments to the matrix multiplication instruction 112 rather than creating the intermediate matrices 124 and calling the vector multiplication instruction 114 directly.

The environment 100 includes the matrix multiplication kernel 102. In some implementations, the matrix multiplication kernel 102 may be a software component accessible by programs running on a computing device containing the processor 110. The matrix multiplication kernel 102 may present an Application Programming Interface (API) to the programs including a mechanism to specify a pair of matrices to be multiplied, such as a function or procedure. In some cases, the matrix multiplication kernel 102 may be kernel module within an operating system, such as LINUX, Berkeley Software Distribution (BSD), UNIX, or other operating systems. The matrix multiplication kernel 102 may also be a hardware component connected to the processor 110 and accessible by the programs.

The matrix multiplication kernel 102 may interact with the processor to execute instructions for performing a matrix multiplication operation. In some cases, the matrix multiplication kernel 102 may issue assembly or machine language instructions to the processor 110 to execute instructions. The matrix multiplication kernel 102 may also execute instructions on the processor 110 using an API associated with the processor 110, such as a software module provided by the manufacturer of the processor 110.

In operation, the matrix multiplication kernel 102 uses instructions on the processor 110 to create the intermediate matrices 124 from the argument matrices 122. For example, the matrix multiplication kernel 102 may instruct the processor 110 to allocate memory for the intermediate matrices 124, and to populate the intermediate matrices 124 with interleaved values from the argument matrices 122 as described herein. This interleaving may be performed, for example, by using unpack instructions of the processor 110 operable to read values from one location in memory (e.g., the argument matrices 122) and write the values to another location (e.g., the intermediate matrices 124).

The environment 100 includes the processor 110. Although illustrated as a single processor 108 in FIG. 1, two or more processors may be included in particular implementations of environment 100. The processor 108 may be a central processing unit (CPU), a blade, an application specific integrated circuit (ASIC), a field-programmable gate array (FPGA), or another suitable component. The processor 108 may also be a single processor core of a larger processor including multiple integrated processor cores.

In some implementations, the processor 110 may include a distributed system including multiple processors connected by a communications network, and operable to perform multiple instructions in parallel. For example, the distributed system may be operable to execute multiple vector multiplication instructions 114 in parallel on different portions of the intermediate matrices 124. The matrix multiplication kernel 102 may communicate with a management component of this distribute system in order to execute instructions. The memory 120 (described below) may be a distributed storage system accessible by the multiple processors or including storage resources associated with each processor.

The processor 110 includes a matrix multiplication instruction 112. In some implementations, the matrix multiplication instruction 112 may perform matrix multiplication using a technique different than the vector multiplication technique described herein. The matrix multiplication kernel 102 may avoid using the matrix multiplication instruction 112 in such a case. In some cases, the matrix more application instruction 112 may be implemented to perform matrix multiplication according to the optimized techniques described herein. In such a case, the matrix multiplication kernel 102 may use the matrix multiplication instruction 112 to multiply the argument matrices 122.

The processor 110 includes vector multiplication instruction 114. In operation, vector multiplication instruction 114 takes a pair of vectors as arguments. Elements at the same index in the pair of vectors are multiplied, and adjacent products are added together to produce a result matrix. For example, given the vectors (1,2,3,4) and (5,6,7,8), the vector multiplication instruction 114 may first multiply elements at the same index in the vectors, yielding intermediate vector of (5, 12, 21, 32). The vector multiplication instruction 114 may then add adjacent values to produce a result vector including the values 17 (i.e., 5+12) and 53 (i.e., 21+32). The use of the vector multiplication instruction 114 is described in greater detail below.

Environment 100 includes a memory 120. In some implementations, the memory 120 may be a storage device or set of storage devices integrated within the computing device including the processor 110, such as, for example, a hard drive, Random Access Memory (RAM), flash memory, or other storage devices or combinations of storage devices. The memory 120 may also be an external storage device accessed by the processor 110 over a communications network, such as, for example, Fibre Channel, Ethernet, USB, IEEE 1394, or other networks.

The memory 120 includes argument matrices 122. In some implementations, the argument matrices 122 may include numeric values stored in rows and columns in a contiguous block of the memory 120. The argument matrices 122 may also be stored non-continuously, such as in a paging system or block-based storage system. In some cases, each of the argument matrices 122 may be associated with a memory address used by the matrix multiplication kernel 102 and the processor 110 to refer to the matrix when interacting with the memory 120. Individual elements within the argument matrices 122 may be accessed by specifying offsets from the memory address.

In some implementations, the argument matrices 122 may store different types of numeric values, including, but not limited to, bits, characters, bytes, integers of various sizes (e.g., 16-bit, 32-bit, 64-bit), floating-point numbers, double precision floating-point numbers, memory addresses, or other types of numeric values.

The memory 120 includes intermediate matrices 124. In some implementations, the matrix multiplication kernel 102 creates the intermediate matrices 124 from the argument matrices 122 to organize values from the argument matrices 122 for use with the vector multiplication instruction 114. In some cases, the matrix multiplication kernel 102 may rearrange values in the argument matrices 122 in place, such that the intermediate matrices 124 need not be created. The intermediate matrices 124 may also be created by the processor 110 in cases where the matrix multiplication instruction 112 implements the vector multiplication techniques described herein. In some implementations, the intermediate matrices 124 may be deallocated or freed in the memory 120 when the associated matrix multiplication completes.

The memory 120 includes the product matrix 126. In some cases, the product matrix 126 stores the results of the matrix multiplication operation performed by the matrix multiplication kernel 102. The product matrix 126 may be allocated before the matrix multiplication operation begins, or it may be allocated when the first result values from the matrix multiplication operation are to be placed in it.

In some cases, the various structures in the memory 120 may be loaded into caches or registers associated with the processor 110 during the matrix multiplication operation. For example, when the matrix multiplication kernel 102 executes a series of vector multiplication instructions 114 on a portion of the intermediate matrices 124, the values from the intermediate matrices 124 may be stored in a cache or in registers of the processor 110 to increase the speed of the operation. The processor 110 may store these values automatically, or the matrix multiplication kernel 102 may explicitly indicate to the processor 110 which value to store.

Figure 2:
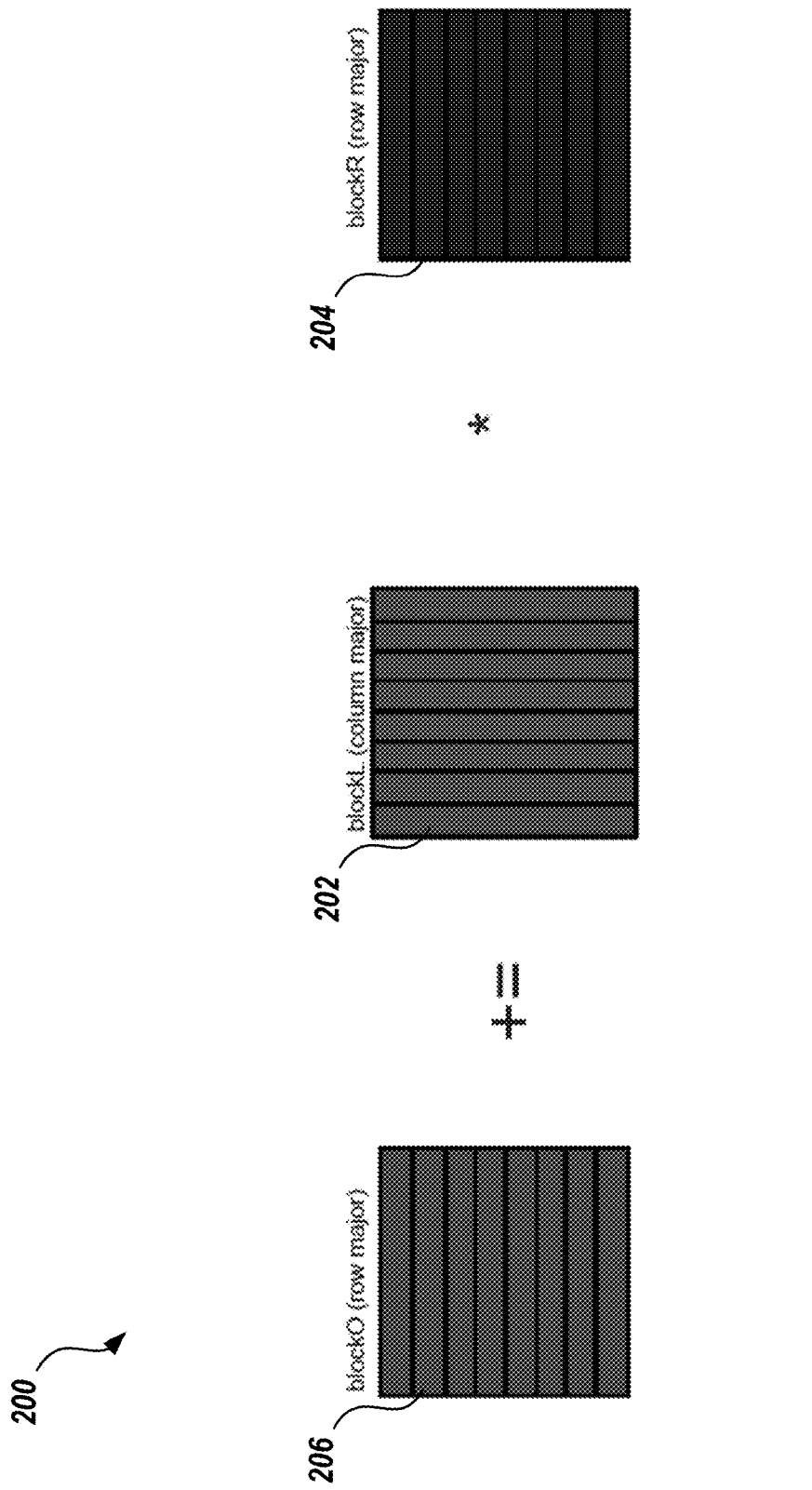
FIGS. 2-9 are block diagrams showing steps of an example optimized matrix multiplication operation using vector multiplication of interleaved matrix values.

FIGS. 2-9 are block diagrams show steps of an example optimized matrix multiplication operation using vector multiplication of interleaved matrix values. FIG. 2 shows a matrix multiplication operation 200 in which a column major matrix 202 is multiplied by a row major matrix 204 to produce a product matrix 206. In some implementations, the order of the matrices to be multiplied may be reversed, such that the row major matrix 204 appears first and is multiplied by the column major matrix 202.

Figure 3:
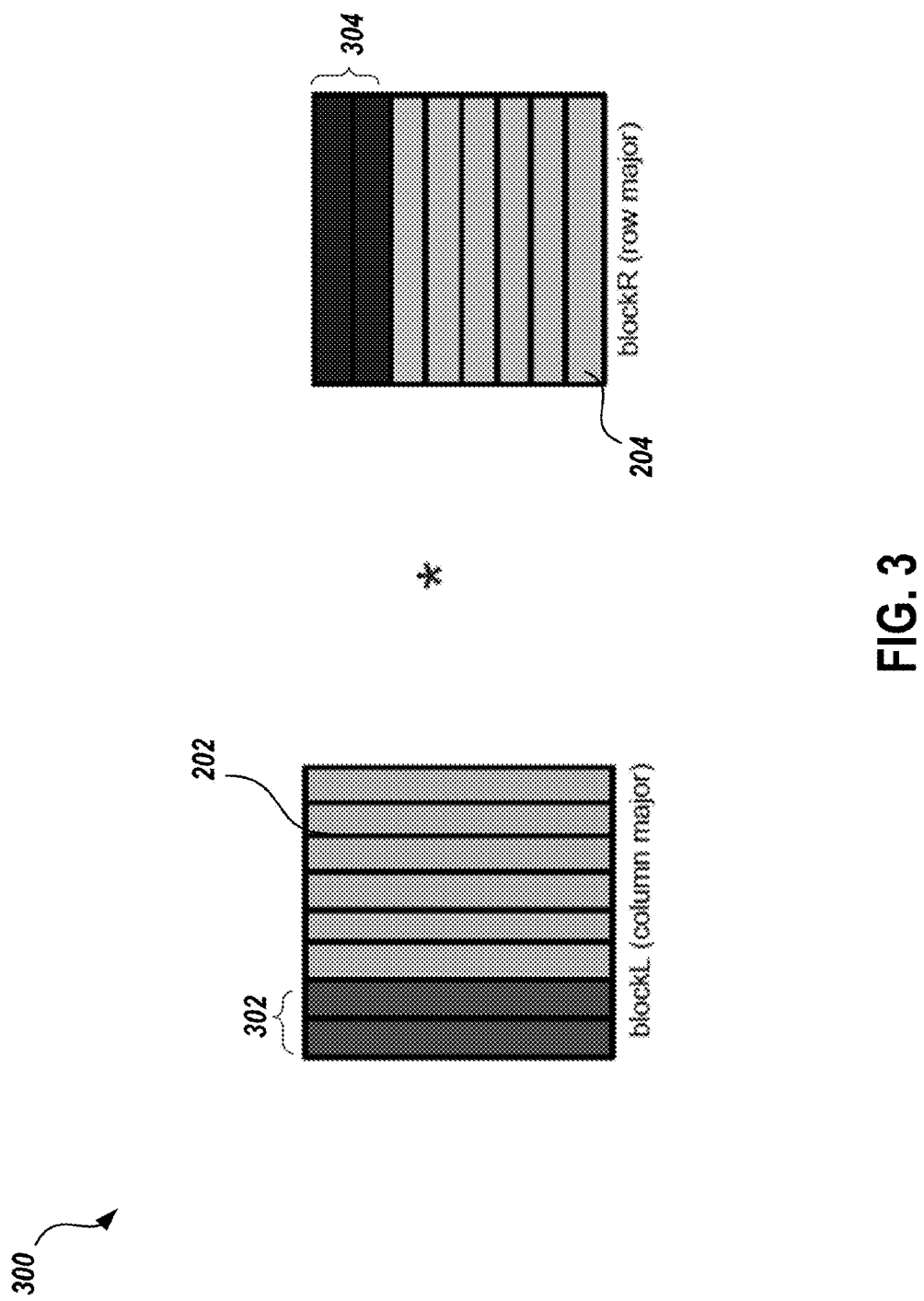

FIG. 3 shows a configuration 300 illustrating columns 302 of the column major matrix 202 and rows 304 of the row major matrix 204 to be multiplied together during the matrix multiplication operation. If two elements of the same row of column major matrix 202 are multiplied by two elements of the same column of row major matrix 204, these products should be combined into a single result in the matrix multiplication operation. This property of matrix multiplication allows the vector multiplication instruction discussed previously, which sums adjacent pairs of values in the result vector, to be used to multiply these values, as discussed in more detail below.

Figure 4:
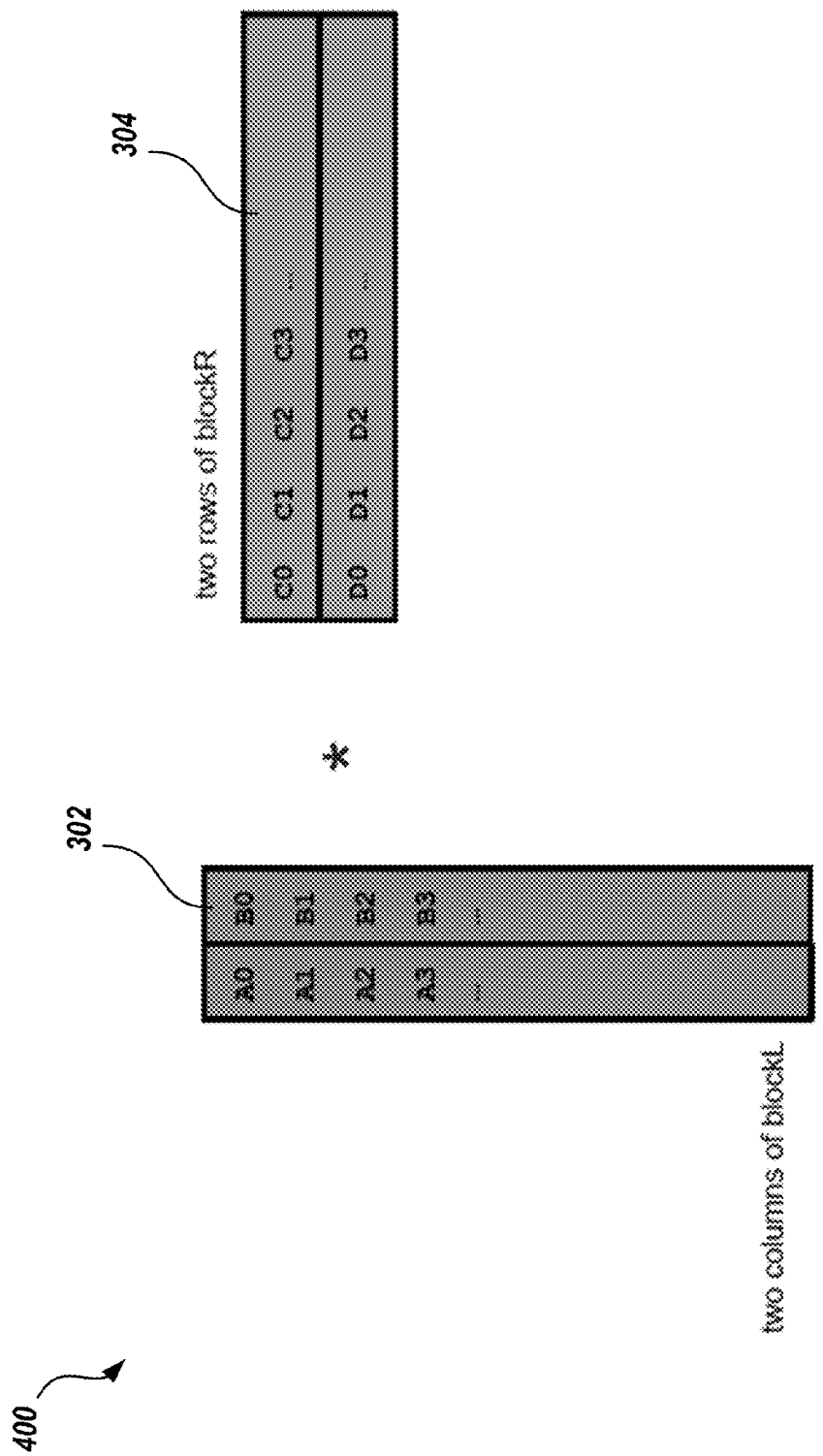

FIG. 4 shows a configuration 400 including the columns 302 from the column major matrix 202, and the corresponding rows 304 from the row major matrix 204. As shown, the first of the columns 302 includes values beginning with "A" (e.g., A0, A1, A2, etc.). The second of the columns 302 includes values beginning with "B" (e.g., B0, B1, B2, etc.). The first of the rows 304 includes values beginning with "C" (e.g., C0, C1, C2, etc.). The second of the rows 304 includes values beginning with "D" (e.g., D0, D1, D2, etc.).

Figure 5:
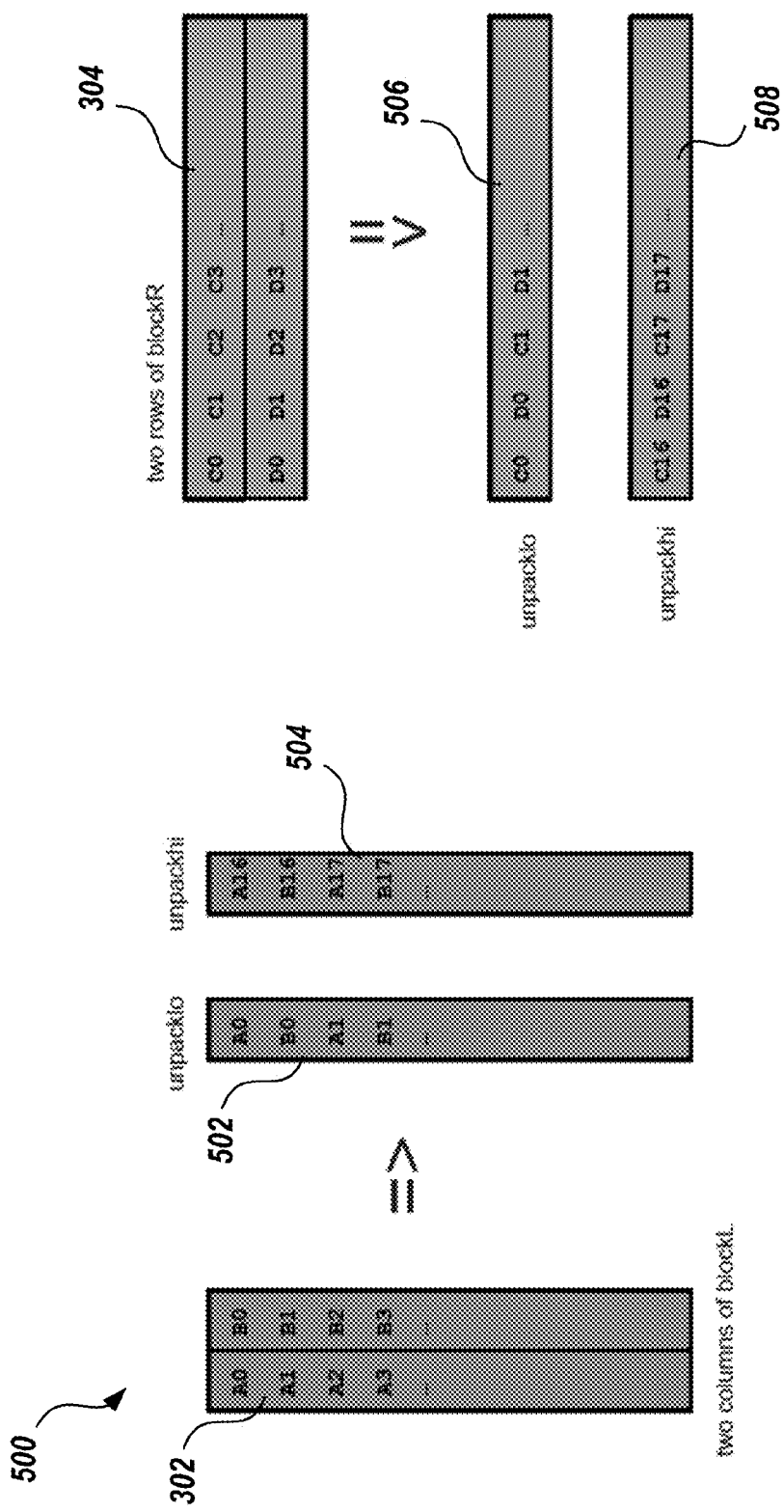
Figure 6:
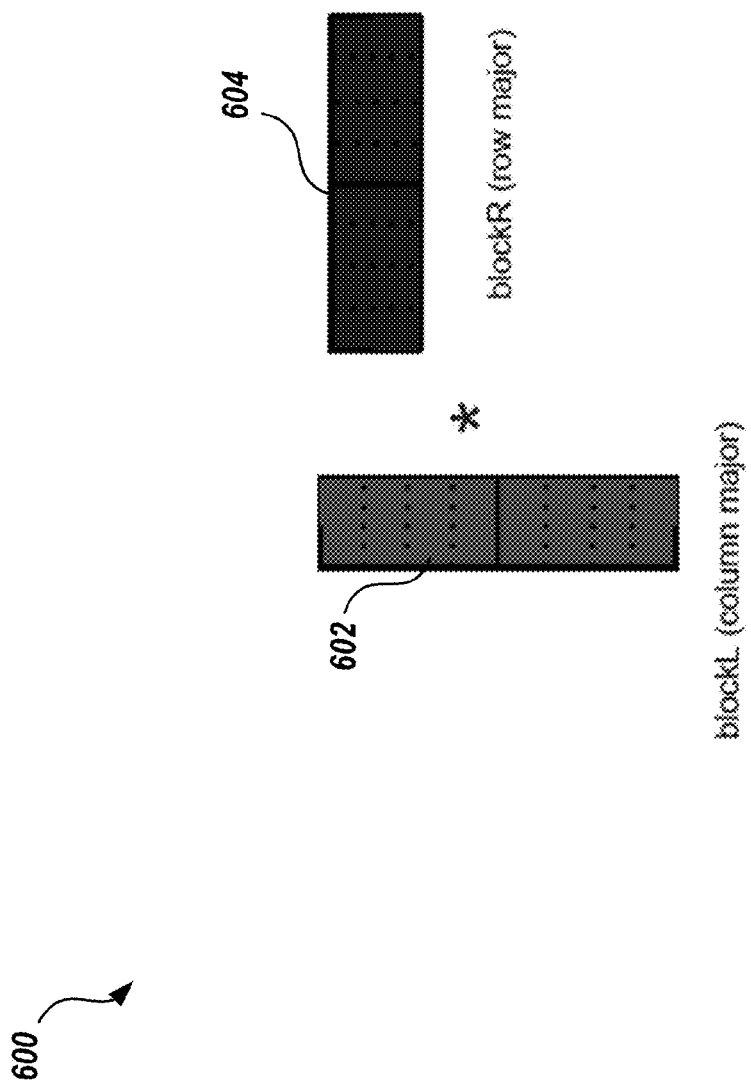

FIG. 5 shows in operation 500 in which values from the columns 302 are interleaved as shown in columns 502 and 504. As shown, the first column 502 includes a value from the first of the columns 302 (A0), followed by a value from the second of the columns 302 (B0), followed by the next value from the first of the columns 302 (A1), followed by the next value from the second of the columns 302 (B1). This interleaving pattern repeats for all values in the column 302 until the first column 502 and the second column 504 are filled. Similarly, the values from the rows 304 are interleaved into rows 506 and 508 such that a value from the first row (C0) is followed by a value from the second row (D0), and the interleaving pattern repeats as before. In some implementations, the first column 502 and the first row 506 are initialized using a vector extraction instruction, such as, for example, "unpacklo," to extract the appropriate values from the columns 302 and the rows 304 respectively. In such implementations, the second column 504 and the second row 508 are initialized using a vector extraction instruction, such as, for example, "unpackhi," to extract the appropriate values from the columns 302 and the rows 304 respectively. In some cases, the columns 502 and 504 and the rows 506 and 508 may be stored as part of intermediate matrices to be used during the optimized matrix multiplication operation, as described in greater detail below. FIG. 6 shows a portion of the intermediate column major matrix 602 and the intermediate row major matrix 604.

Figure 7:
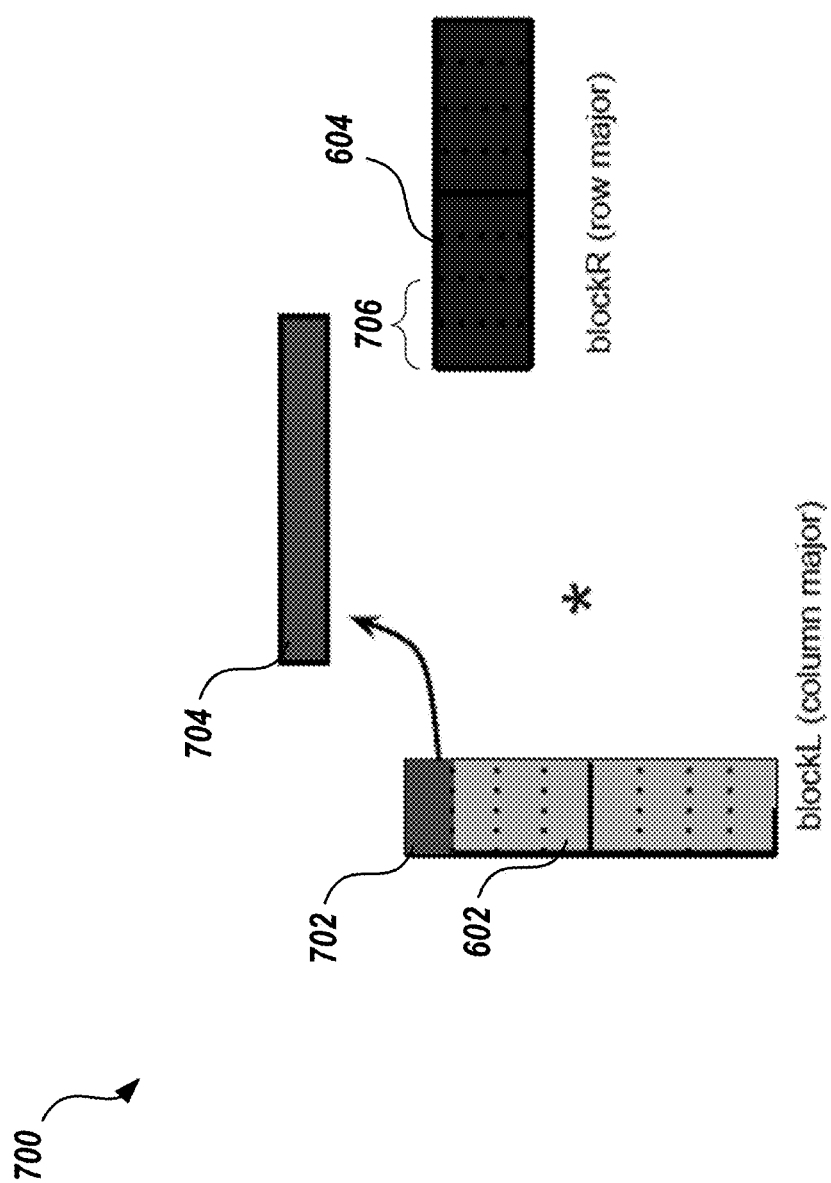

FIG. 7 shows an operation 700 used prepare a column vector 704 for use with a vector multiplication instruction. The first two elements 702 of the intermediate column major matrix 602 are repeated in the column vector 704, which has the same size as a row vector 706 from the intermediate row major matrix 604 containing values from row offsets corresponding to the elements of column vector 704. In the illustrated case, the size of column vector 704 will be four, so the two elements will be repeated once.

Figure 8:
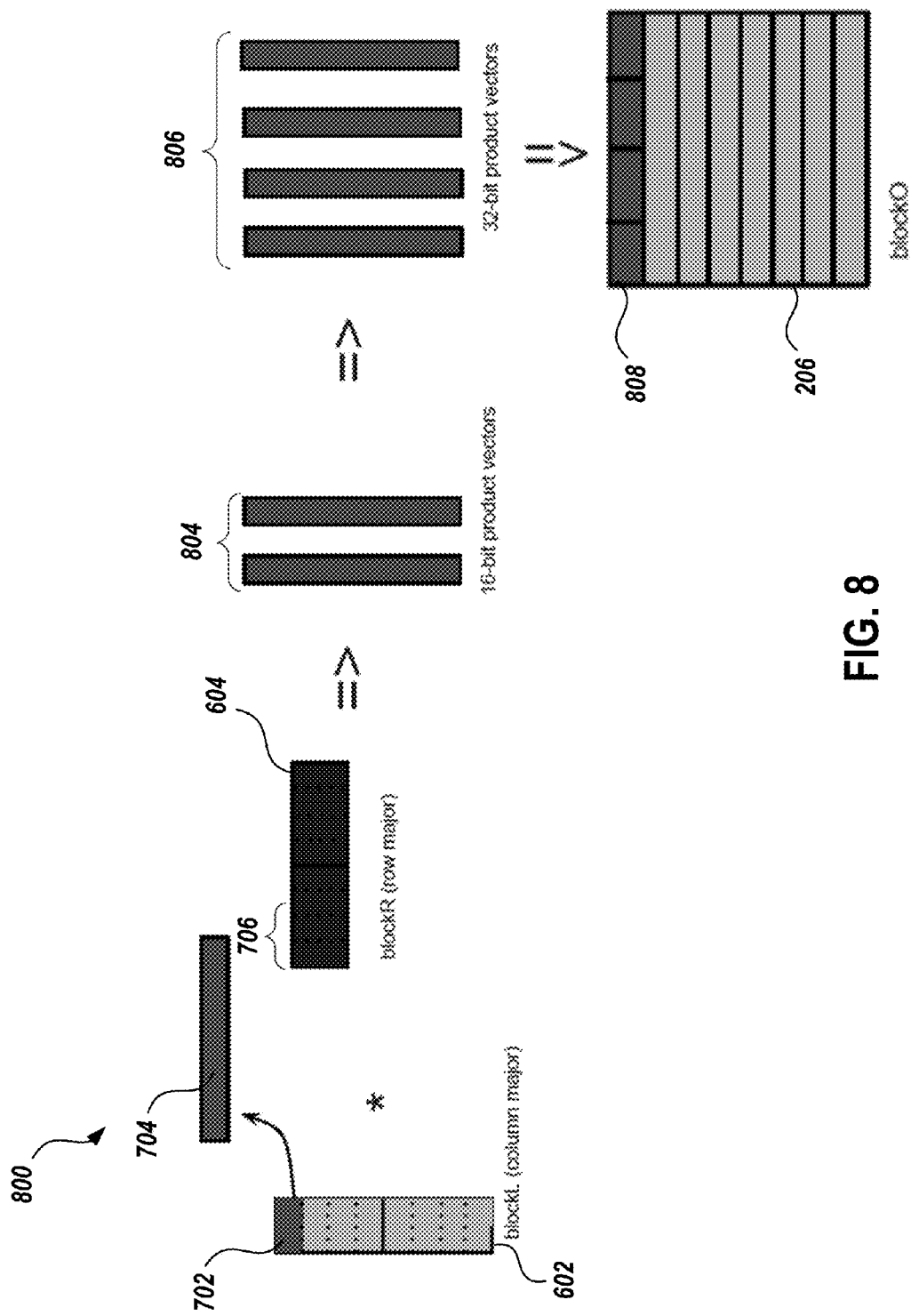

FIG. 8 shows an operation 800 in which the column vector 704 is multiplied by the row vector 706. Because of the ordering of elements in the column vector 704 and the row vector 706, the summing of adjacent elements by the vector multiplication operation corresponds to summing that would be performed in a matrix multiplication operation. For example, column vector 704, in the illustrated implementation, may contain the values "A0, A16, A0, A16," and the row vector 706 contains the values "C0, C16, D0, D16." The resulting product vectors 804 will contain the values "((A0*C0)+(A16*C16))" and "((A0*D0)+(A16*D16))." In some cases, the product vectors 804 may be converted into four larger product vectors 806 and inserted into the product matrix 206 at position 808. The product vectors 804 may also keep the results in 8-bit or 16-bit format.

Figure 9:
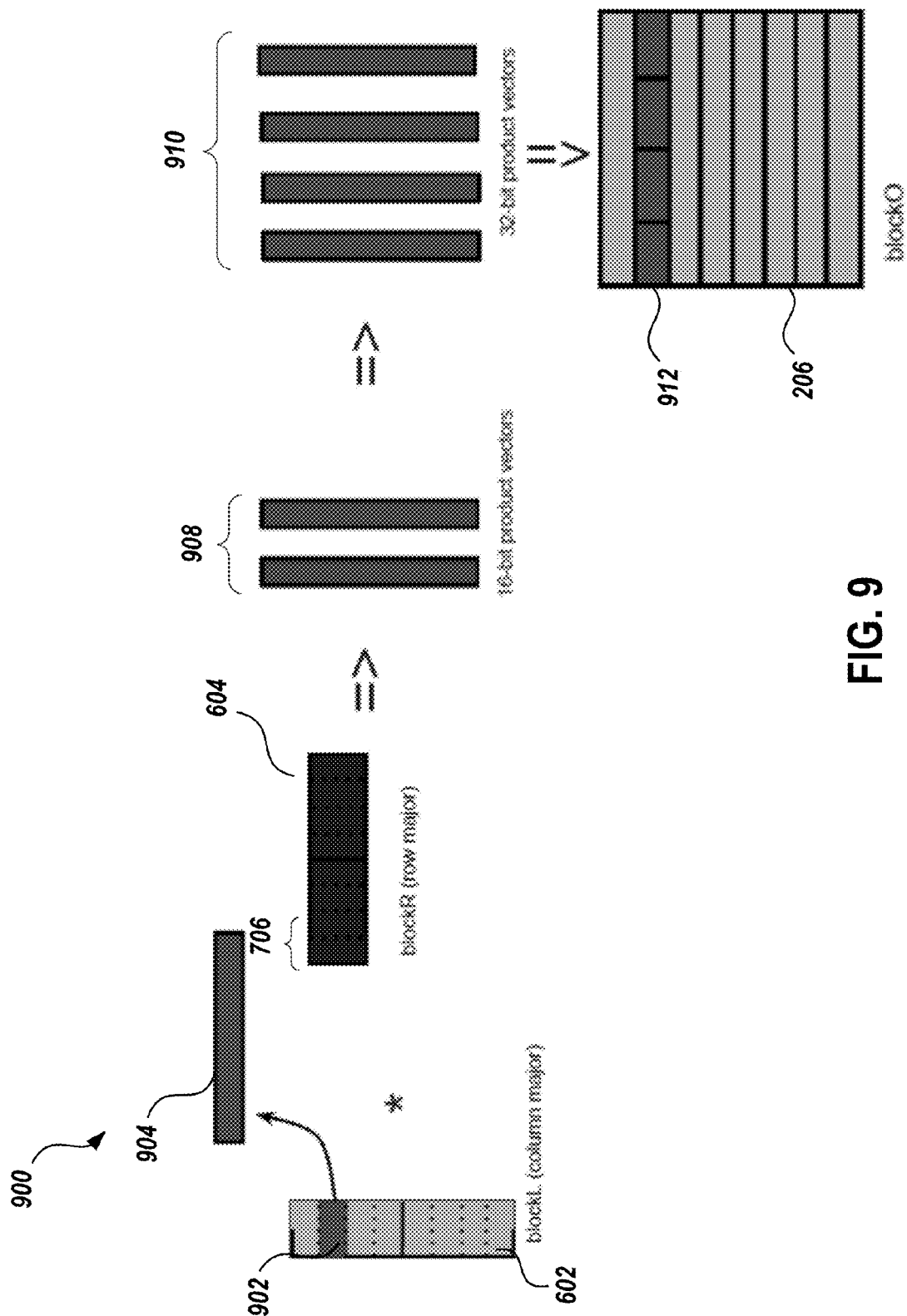

FIG. 9 shows in operation 900 in which the next two elements 902 of the intermediate column major matrix 602 are repeated in the column vector 904, which has the same size as the row vector 706 from the intermediate row major matrix 604 containing values from row offsets corresponding to the elements of column vector 904. In the illustrated case, the size of column vector 904 will be four, so the two elements will be repeated once. The column vector 904 is multiplied by the row vector 706. Again, because of the ordering of elements in the column vector 904 and the row vector 706, the summing of adjacent elements by the vector multiplication operation corresponds to summing that would be performed in a matrix multiplication operation. For example, column vector 904, in the illustrated implementation, may contain the values "B0, B16, B0, B16," and the row vector 706 contains the values "C0, C16, D0, D16." The resulting product vectors 804 will contain the values "((B0*C0)+(B16*C16))" and "((B0*D0)+(B16*D16))." The product vectors 908 are converted into four larger product vectors 910 and inserted into the product matrix 206 at position 912.

Figure 10:
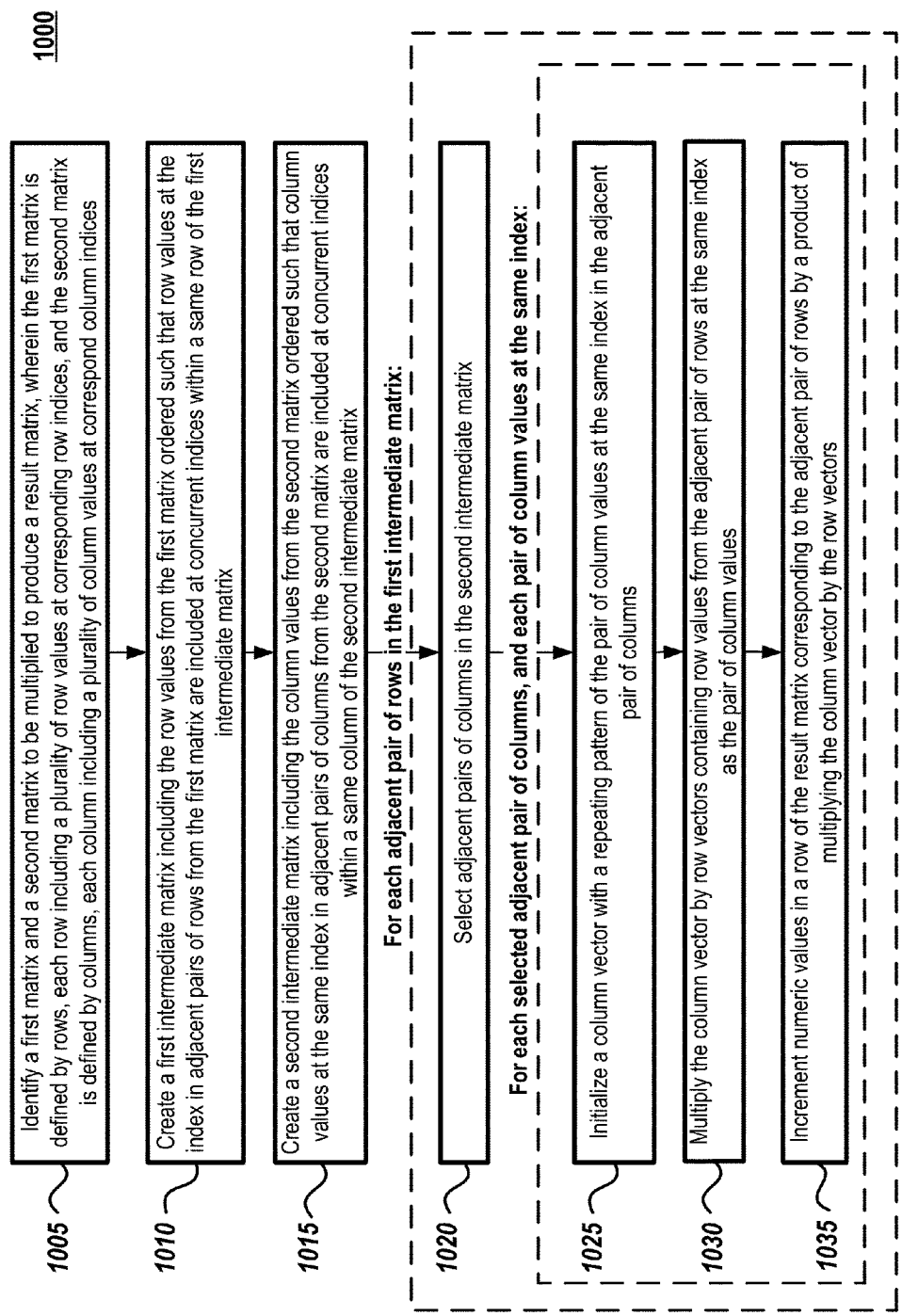
FIG. 10 is a flow diagram of an example process for performing optimized matrix multiplication operation using vector multiplication of interleaved matrix values.

FIG. 10 is a flow diagram of an example process 1000 for performing optimized matrix multiplication operation using vector multiplication of interleaved matrix values. At 1005, a first matrix in the second matrix to be multiplied to produce a result matrix are identified. In some cases, the first matrix is defined by rows with each row including a plurality of row values add corresponding row indices, and the second matrix is defined by columns with each column including a plurality of column values add corresponding column indices. The matrices may also be reversed, such that the first matrix is defined by columns in the second matrix is defined by rows.

At 1010, a first intermediate matrix is created including the row values from the first matrix ordered such that row values at the index in adjacent pairs of rows from the first matrix are included at concurrent indices within the same row of the intermediate matrix. In some implementations, the first intermediate matrix may be the first matrix with the values reordered, such that storage space for a new matrix need not be allocated.

At 1015, a second intermediate matrix is created including the column values from the second matrix ordered such that column values at the same index in adjacent pairs of columns from the second matrix are included at concurrent indices within a same column of the second intermediate matrix. In some implementations, the second intermediate matrix may be the second matrix with the values reordered, such that storage space for a new matrix need not be allocated.

The remaining steps of the process 1000 are repeated for each adjacent pair of rows in the first intermediate matrix. At 1020, adjacent pairs of columns are selected in the second intermediate matrix. The remaining steps of the process 1000 repeated for each selected adjacent pair of columns, and each pair of column values at the same index.

At 1025, a column vector is initialized with a repeating pattern of the pair of column values at the same index in the adjacent pair of columns. At 1030, the column vector is multiplied by row vectors containing row values from the adjacent pair of rows at the same index as the pair of column values. At 1035, numeric values in a row of the result matrix corresponding to the adjacent pair of rows are incremented by a product of multiplying the column vector by the row vectors.

Figure 11:
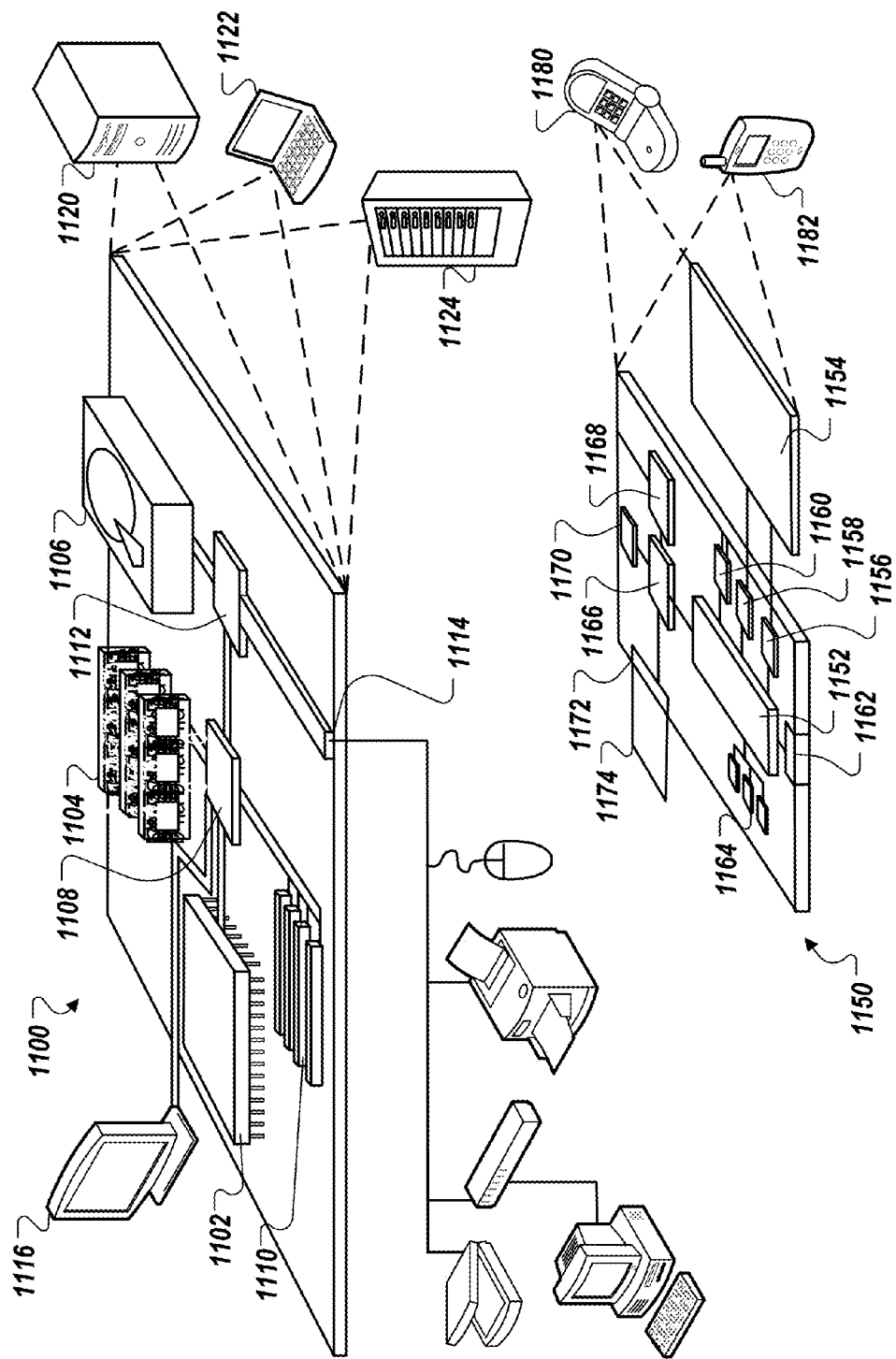
FIG. 11 is a block diagram of an example computing device.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. Additionally computing device 1100 or 1150 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed interface 1108 manages bandwidth-intensive operations for the computing device 1100, while the low speed interface 1112 manages lower bandwidth-intensive operations. Such allocation of functions is exemplary only. In one implementation, the high-speed interface 1108 is coupled to memory 1104, display 1116 (e.g., through a graphics processor or accelerator), and to high-speed expansion ports 1110, which may accept various expansion cards (not shown). In the implementation, low-speed interface 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. Additionally, the processor may be implemented using any of a number of architectures. For example, the processor 1152 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provided in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provided as a security module for device 1150, and may be programmed with instructions that permit secure use of device 1150. In addition, secure applications may be provided via the SIMM cards, along with additional information, such as placing identifying information on the SIMM card in a non-hackable manner.

The memory 1164 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152 that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a filesystem. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising operations including:

identifying a first matrix and a second matrix to be multiplied to produce a result matrix, wherein the first matrix is defined by rows, each row including a plurality of row values at corresponding row indices, and the second matrix is defined by columns, each column including a plurality of column values at correspond column indices;

creating a first intermediate matrix including the row values from the first matrix ordered such that row values at the same index in adjacent pairs of rows from the first matrix are included at concurrent indices within a same row of the first intermediate matrix, the first intermediate matrix including at least two rows;

creating a second intermediate matrix including the column values from the second matrix ordered such that column values at the same index in adjacent pairs of columns from the second matrix are included at concurrent indices within a same column of the second intermediate matrix, the second intermediate matrix including at least two columns;

for each adjacent pair of rows in the first intermediate matrix:

selecting adjacent pairs of columns in the second intermediate matrix, and for each selected adjacent pair of columns, and each pair of column values at the same index in the selected adjacent pair of columns:

initialize a column vector with a repeating pattern of the pair of column values at the same index in the adjacent pair of columns;

multiply the column vector by row vectors from the adjacent pair of rows containing row values at the same index as the pair of column values; and increment numeric values in a row of the result matrix corresponding to the adjacent pair of rows by a product of multiplying the column vector by the row vectors.

2. The method of claim 1, wherein the one or more processor include a matrix multiplication instruction, and the method does not include executing the matrix multiplication instruction.

3. The method of claim 1, wherein the one or more processor include a matrix multiplication instruction operable to perform the operations and the method further comprises, before identifying the first matrix and the second matrix, executing the matrix multiplication instruction to perform the operations.

4. The method of claim 1, wherein multiplying the column vector by the row vectors includes executing a vector multiplication instruction included in the one or more processors and operable to multiply values at same indices in the column vector and each row vector together to produce a temporary vector, and to add pairs of adjacent values together to produce a product vector.

5. The method of claim 4, wherein multiplying the column vector by the row vectors includes converting each product vector into two larger product vectors, each larger product vector including twice as many bits as the product vector.

6. The method of claim 5, wherein converting each product vector into two larger product vectors includes multiplying each product vector by a vector including corresponding values of one for each value in the product vector.

7. The method of claim 1, wherein the one or more processors are a plurality of processors connected by a communications network, and the plurality of processors are operable to perform multiple instances of initializing the column vector and multiplying the column vector by the row vectors in parallel.

8. A computer-implemented method executed by one or more processors, the method comprising operations including:
    identifying a first matrix and a second matrix to be multiplied to produce a result matrix, wherein the first matrix is defined by columns, each column including a plurality of column values at corresponding column indices, and the second matrix is defined by rows, each row including a plurality of row values at correspond row indices;
    creating a first intermediate matrix including the column values from the first matrix ordered such that column values at the same index in adjacent pairs of columns from the first matrix are included at concurrent indices within a same column of the first intermediate matrix, the first intermediate matrix including at least two columns;
    creating a second intermediate matrix including the row values from the second matrix ordered such that row values at the same index in adjacent pairs of rows from the second matrix are included at concurrent indices within a same row of the second intermediate matrix, the second intermediate matrix including at least two rows;
    for each adjacent pair of columns in the first intermediate matrix:
        selecting adjacent pairs of rows in the second intermediate matrix, and for each selected adjacent pair of rows, and each pair of row values at the same index in the selected adjacent pair of rows:
            initialize a row vector with a repeating pattern of the pair of row values at the same index in the adjacent pair of rows;
            multiply the row vector by column vectors from the adjacent pair of columns containing column values at the same index as the pair of row values; and
            increment numeric values in a column of the result matrix corresponding to the adjacent pair of columns by a product of multiplying the row vector by the column vectors.

9. The method of claim 8, wherein the one or more processor include a matrix multiplication instruction, and the method does not include executing the matrix multiplication instruction.

10. The method of claim 8, wherein the one or more processor include a matrix multiplication instruction operable to perform the operations and the method further comprises, before identifying the first matrix and the second matrix, executing the matrix multiplication instruction to perform the operations.

11. The method of claim 8, wherein multiplying the row vector by the column vectors includes executing a vector multiplication instruction included in the one or more processors and operable to multiply values at same indices in the row vector and each column vector together to produce a temporary vector, and to add pairs of adjacent values together to produce a product vector.

12. The method of claim 11, wherein multiplying the row vector by the column vectors includes converting each product vector into two larger product vectors, each larger product vector including twice as many bits as the product vector.

13. The method of claim 12, wherein converting each product vector into two larger product vectors includes multiplying each product vector by a vector including corresponding values of one for each value in the product vector.

14. The method of claim 8, wherein the one or more processors are a plurality of processors connected by a communications network, and the plurality of processors are operable to perform multiple instances of initializing the row vector and multiplying the row vector by the column vectors in parallel.

15. A system comprising:
    memory for storing data; and
    one or more processors operable to perform operations comprising:
        identifying a first matrix and a second matrix to be multiplied to produce a result matrix, wherein the first matrix is defined by rows, each row including a plurality of row values at corresponding row indices, and the second matrix is defined by columns, each column including a plurality of column values at correspond column indices;
        creating a first intermediate matrix including the row values from the first matrix ordered such that row values at the same index in adjacent pairs of rows from the first matrix are included at concurrent indices within a same row of the first intermediate matrix, the first intermediate matrix including at least two rows;
        creating a second intermediate matrix including the column values from the second matrix ordered such that column values at the same index in adjacent pairs of columns from the second matrix are included at concurrent indices within a same column of the second intermediate matrix, the second intermediate matrix including at least two columns;
        for each adjacent pair of rows in the first intermediate matrix:
            selecting adjacent pairs of columns in the second intermediate matrix, and for each selected adjacent pair of columns, and each pair of column values at the same index in the selected adjacent pair of columns:

initialize a column vector with a repeating pattern of the pair of column values at the same index in the adjacent pair of columns;

multiply the column vector by row vectors from the adjacent pair of rows containing row values at the same index as the pair of column values; and increment numeric values in a row of the result matrix corresponding to the adjacent pair of rows by a product of multiplying the column vector by the row vectors.

16. The system of claim 15, wherein the one or more processor include a matrix multiplication instruction, and the operations do not include executing the matrix multiplication instruction.

17. The system of claim 15, wherein the one or more processor include a matrix multiplication instruction operable to perform the operations and the operations further comprises, before identifying the first matrix and the second matrix, executing the matrix multiplication instruction to perform the operations.

18. The system of claim 15, wherein multiplying the column vector by the row vectors includes executing a vector multiplication instruction included in the one or more processors and operable to multiply values at same indices in the column vector and each row vector together to produce a temporary vector, and to add pairs of adjacent values together to produce a product vector.

19. The system of claim 18, wherein multiplying the column vector by the row vectors includes converting each product vector into two larger product vectors, each larger product vector including twice as many bits as the product vector.

20. The system of claim 19, wherein converting each product vector into two larger product vectors includes multiplying each product vector by a vector including corresponding values of one for each value in the product vector.

* * * * *